United States Patent
Rao et al.

(10) Patent No.: US 12,455,866 B2
(45) Date of Patent: Oct. 28, 2025

(54) MULTIPLE COLUMN ORDER PRESERVING COMPRESSION

(71) Applicant: INTERNATIONAL BUSINESS MACHINES CORPORATION, Armonk, NY (US)

(72) Inventors: Rajat Rao, Bangalore (IN); Abinaya B, Cuddalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/603,819

(22) Filed: Mar. 13, 2024

(65) Prior Publication Data

US 2025/0291777 A1    Sep. 18, 2025

(51) Int. Cl.
*G06F 16/20* (2019.01)
*G06F 16/22* (2019.01)
*G06F 16/2453* (2019.01)

(52) U.S. Cl.
CPC ........ *G06F 16/221* (2019.01); *G06F 16/2282* (2019.01); *G06F 16/2453* (2019.01)

(58) Field of Classification Search
USPC ........................................................ 707/693
See application file for complete search history.

(56) References Cited

U.S. PATENT DOCUMENTS

| | | | |
|---|---|---|---|
| 9,165,109 B2* | 10/2015 | Chaisson | G16B 40/30 |
| 9,852,169 B2* | 12/2017 | Faerber | G06F 16/2455 |
| 10,824,596 B2* | 11/2020 | Mueller | G06F 16/221 |
| 2009/0006399 A1* | 1/2009 | Raman | G06F 16/2453 |
| | | | 707/E17.046 |
| 2016/0226512 A1 | 8/2016 | Dickie | |
| 2021/0191915 A1 | 6/2021 | Arye et al. | |
| 2022/0414078 A1 | 12/2022 | Junker et al. | |
| 2023/0089082 A1 | 3/2023 | Schreter | |

OTHER PUBLICATIONS

Antoshenkov, Gennady et al., "Order Preserving Key Compression," CLR 94/3, Jun. 16, 1994, pp. 1-28.

* cited by examiner

*Primary Examiner* — Belix M Ortiz Ditren
(74) *Attorney, Agent, or Firm* — Teddi Maranzano, Esq.; Heslin Rothenberg Farley & Mesiti P.C.; George S. Blasiak, Esq.

(57) ABSTRACT

Methods, computer program products, and systems are presented. The method computer program products, and systems can include, for instance: performing order preserving compression of a multiple column index table of a database to provide an encoded index table sorted by an initial column, wherein the multiple column index table includes the initial column and one or more subsequent column; and determining, in dependence on a result of the performing the order preserving compression, at least one modification factor for respective ones of the one or more subsequent column.

20 Claims, 5 Drawing Sheets

MULTIPLE COLUMN ORDER PRESERVING COMPRESSION

BACKGROUND

Embodiments herein relate to databases generally and specifically to a database featuring reduced latency.

The present disclosure relates to databases and particularly to operations for databases. Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table. Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table. A Database index is a database data structure that can be used for improving performance of database operations, such as the aforementioned INSERT, UPDATE, SELECT, and DELETE operations that can be performed with use of SQL statements. A database table index can be characterized by a hierarchical structure having leaf pages at a lowest level referred to as a leaf page level, intermediary (non leaf) pages at one or more intermediary level of hierarchy and a highest level of hierarchy consisting of a root page.

SUMMARY

Shortcomings of the prior art are overcome, and additional advantages are provided, through the provision, in one aspect, of a method. The method can include, for example: performing order preserving compression of a multiple column index table of a database to provide an encoded index table sorted by an initial column, wherein the multiple column index table includes the initial column and one or more subsequent column; determining, in dependence on a result of the performing the order preserving compression, at least one modification factor for respective ones of the one or more subsequent column; storing the at least one modification factor to the database; receiving a query; examining the query and determining, based on the examining, that the query references a subsequent column of the one or more subsequent column; responsively to the determining that the query references the subsequent column, retrieving from the database a modification factor for the subsequent column; and processing the query with use of the modification factor for the subsequent column.

In another aspect, a computer program product can be provided. The computer program product can include a computer readable storage medium readable by one or more processing circuit and storing instructions for execution by one or more processor for performing a method. The method can include, for example: performing order preserving compression of a multiple column index table of a database to provide an encoded index table sorted by an initial column, wherein the multiple column index table includes the initial column and one or more subsequent column; determining, in dependence on a result of the performing the order preserving compression, at least one modification factor for respective ones of the one or more subsequent column; storing the at least one modification factor to the database; receiving a query; examining the query and determining, based on the examining, that the query references a subsequent column of the one or more subsequent column; responsively to the determining that the query references the subsequent column, retrieving from the database a modification factor for the subsequent column; and processing the query with use of the modification factor for the subsequent column.

In a further aspect, a system can be provided. The system can include, for example, a memory. In addition, the system can include one or more processor in communication with the memory. Further, the system can include program instructions executable by the one or more processor via the memory to perform a method. The method can include, for example: performing order preserving compression of a multiple column index table of a database to provide an encoded index table sorted by an initial column, wherein the multiple column index table includes the initial column and one or more subsequent column; determining, in dependence on a result of the performing the order preserving compression, at least one modification factor for respective ones of the one or more subsequent column; storing the at least one modification factor to the database; receiving a query; examining the query and determining, based on the examining, that the query references a subsequent column of the one or more subsequent column; responsively to the determining that the query references the subsequent column, retrieving from the database a modification factor for the subsequent column; and processing the query with use of the modification factor for the subsequent column.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
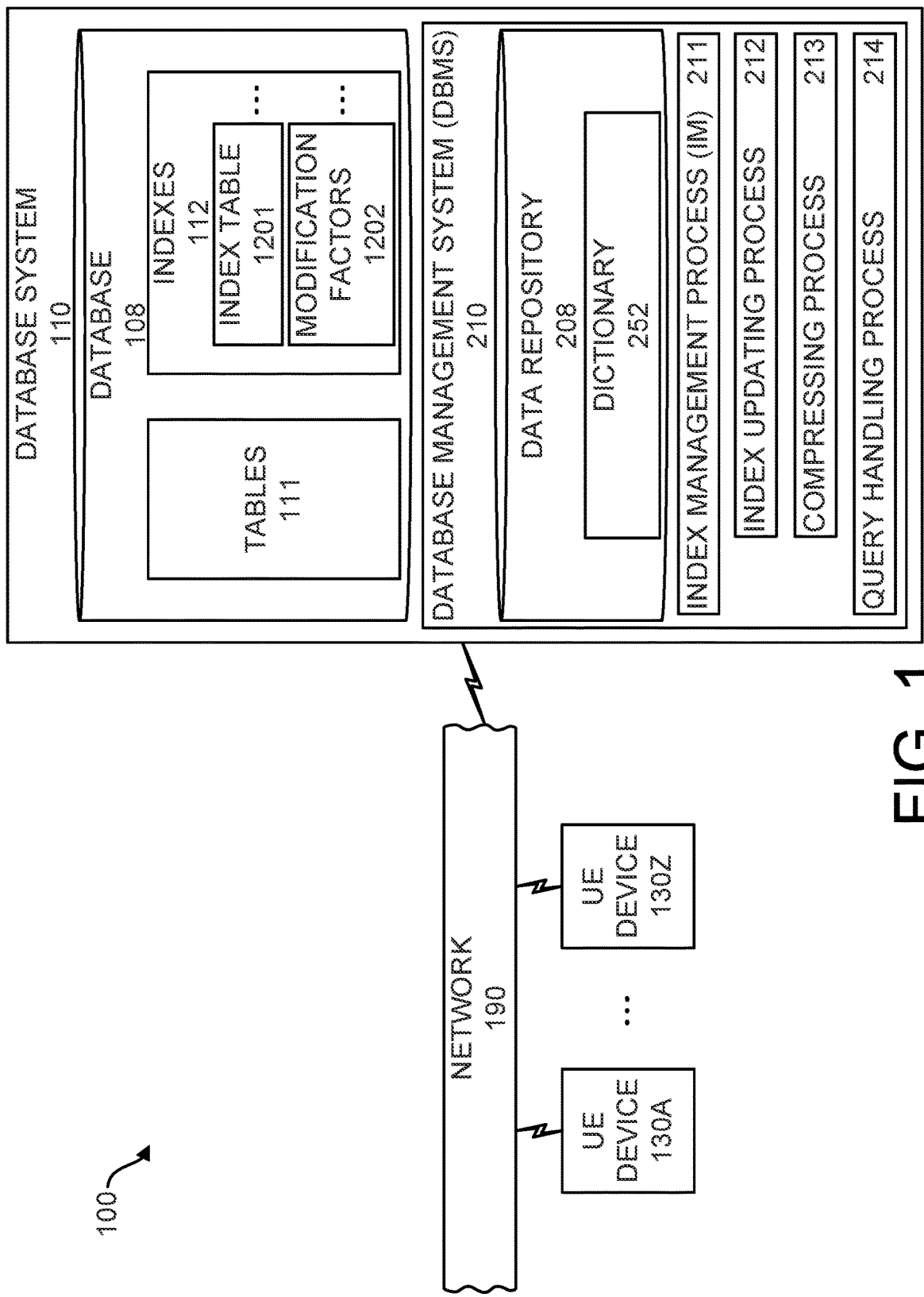
FIG. 1 depicts a system having a database system, and user equipment (UE) devices according to one embodiment.

System 100 for use in reducing response latency in databases as set forth in one embodiment in FIG. 1. System 100, according to one embodiment, can include database system 110 and user equipment (UE) devices 130A-130Z. Database system 110 and UE devices 130A-130Z can be provided by computing node-based devices and systems and can be in communication with one another via network 190. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

Database system 110 can include database 108 and database management system (DBMS) 210 having an associated data repository 208. Database 108 can include tables 111 and indexes 112. Tables 111 can logically organize data into columns and rows of data. A row of data within a table can define a record. Each table of tables 111 can have associated thereto zero or more index of indexes 112.

According to one embodiment, database system 110 can be provided by a Structured Query Language (SQL) database system that is able to respond to SQL based query statements defining queries. In the course of use of system 100, database system 110 can receive queries from one or more UE devices 130A-130Z. Queries received by database system 110 can take the form of query statements such as SQL statements.

A database table index of indexes 112 refers to a data structure that can improve the speed of database operations such as database INSERT, UPDATE, SELECT, and DELETE operations. A database table index of indexes 112 can be represented by a tree diagram and can be characterized by a lowest level referred to as a leaf page level, one or more intermediate non-leaf page level, and a highest level referred to as a root page level consisting of a root page.

Figure 2:
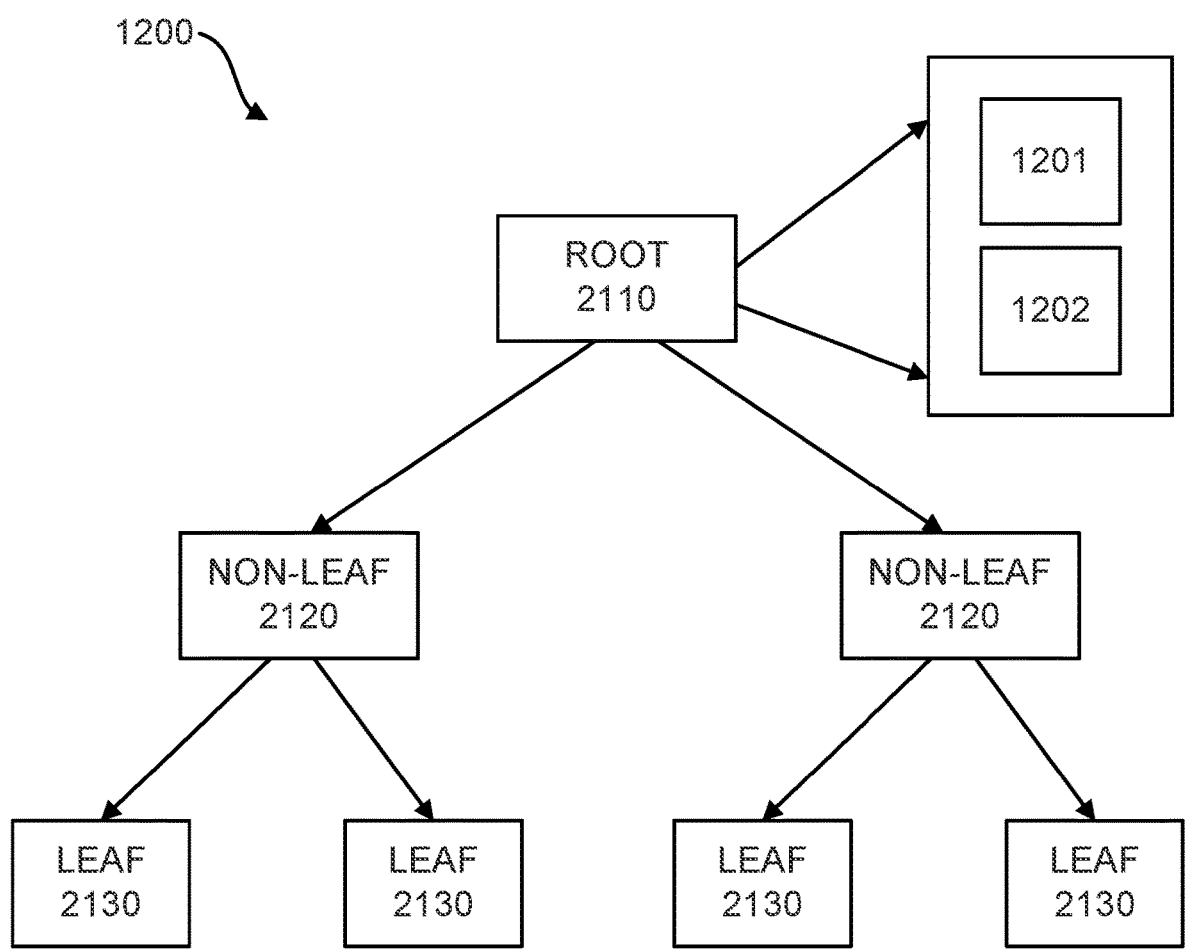
FIG. 2 depicts a data structure for a database index having and index table according to one embodiment.

In FIG. 2 there is shown a data structure for a database index 1200. An index 1200 of indexes 112 can include a root page 2110, non-leaf pages 2120 and leaf pages 2130 on which underlying table data can be stored. In one aspect, root page 2120 can have associated thereto an index table 1201 which can include a raw (uncompressed) and/or compressed state. Index table 1201 can include pointer information for identification of leaf pages on which underlying table data is stored. In accordance with embodiments set forth herein, index table 1201 can include associated modification factors 1202 for recovery of an index table column order and pointer information of index table 1201 when index table 1201 is in a compressed state.

In one embodiment, index table 1201 can define a multiple column index table and can include multiple columns. Providing index table 1201 as a multiple column index table facilitates accelerated access to row data within multiple columns. According to one example, database 108 can be a customer support database. In one example, an enterprise can find use for accelerated access to a specific customer, e.g., accessible via a customer ID column (which can be initial column C0 of the index table 1201), and can also find use for accelerated access to transaction data of a certain data, e.g., accessible via a transaction date column (which can be provided as subsequent column C1-Cn of the index table 1201). Embodiments herein recognize, however, that challenges persist to compressing multiple column index tables. Embodiments herein recognize that when an order preserving compression scheme is used to compress a multiple column index table according to existing technology, the sort order of an initial column is preserved while the sort order information of subsequent columns of the multiple column index table can be expected to be lost.

DBMS 210 can run various processes such as index management process 211 and query handling process 214. DBMS 210 running index management process 211 can include DBMS 210 running index updating process 212 and compressing process 213.

DBMS 210 running index updating process 212 can generate new indexes for tables so that each table of database 108 has associated thereto zero or more indexes. Indexes associated with tables 111 of database 108 can improve the performance of operation with respect to such tables, e.g., can reduce the time required for responding to a query. DBMS 210 running index updating process 212 can include DBMS 210 generating new indexes for tables and, e.g., new leaf pages for indexes. DBMS 210 can generate zero or more indexes per table of tables 111. DBMS 210 running index updating process 212 can include DBMS 210 examining incoming query statement data queries and based on a determination that a current leaf page has insufficient free space to store a new record, can execute an index split operation. An index split operation can include, e.g., allocating a leaf page from a page store, linking related pages to the leaf pages, and copying data from the current leaf page to the newly allocated leaf page. Index management process 211 can define an index manager (IM).

DBMS 210 running compressing process 213 can include DBMS 210 compressing an index table 1201 of an index. Embodiments herein recognize that as row and/or column size of an underlying database table expands, the size of index table 1201 correspondingly expands, and can consume significant storage resources of database 108.

DBMS 210 running compressing process 213 can include DBMS 210 compressing a multiple column index table 1201 of an index 1200 in a manner so that order information of multiple columns of the multiple column index table is preserved. DBMS 210 running compressing process 213 can include DBMS 210 running an order-preserving compression process. DBMS 210 running compressing process 213 can include DBMS 210 determining one or more modification factor for use in preserving order information of one or more subsequent column of a multiple column index table. DBMS 210 running compressing process 213 can include DBMS 210 compressing index table data in accordance with compression rules expressed in a dictionary 252 of data repository 208.

DBMS 210 running query handling process 214 can include DBMS using one or more modification factor determined during performance of compressing process 213 for recovery of order information of a subsequent column of a multiple column index table. DBMS 210 running query handling process 214 can provide accelerated index-assisted access to table data of an underlying database table of tables 111 even where index table 1201 is in a compressed state and a current query references a subsequent column (C1-Cn) after an initial column C0 of the index table 1201.

FIG. 2 is a flowchart depicting a method for performance by database system 110 interoperating with UE devices 130A-130Z. At criterion block 1101, database system 110 can be receiving transaction data from UE devices 130A-130Z which can be sending request data provided by queries defined by query statements iteratively at block 1301.

At criterion block 1101, database system 110 by DBMS 210 can determine whether a criterion has been satisfied for triggering compression of an index table 1201. In one embodiment, DBMS 210 can be configured to perform a cost analysis for determination of whether compression is to be performed. The cost analysis can include evaluation of such parameters as how much compression can be achieved, available storage, resource consumption associated with the performance of compression, patterns of received queries, and the like. DBMS 210 can be configured to perform the described cost analysis e.g., on the receipt of every Nth query, and/or at times intervals, for example. On the determination that compression is to be performed, DBMS 210 can branch to block 1102.

At block 1102, compression of index table 1201 can be performed. In one embodiment, DBMS 210 at block 1102 can perform order-preserving compression (OPC). OPC can improve sorting and searching performance, and hence the performance of database system 110. In one embodiment, order preserving compressing (OPC) can include a parsing technique that can be applied to variable-length "keys", producing substantial compression. An order preserving compression (OPC) scheme herein can both compress and decompress data, permitting variable lengths for dictionary entries into dictionary 252 and compressed forms. In one embodiment, the space of strings can be partitioned into ranges, encoding a common prefix of each range. In one embodiment, DBMS 210 at block 1102 can perform Antoshenkov-Lomet-Murray (ALM) order preserving compression (OPC). In one embodiment, DBMS 210 at block 1102 can employ dictionary-aided OPC aided with use of dictionary 252.

DMBS 210 performing dictionary-aided OPC aided with use of dictionary 252 is described further with reference to the example of Example A.

Example A

Embodiments herein recognize that when DBMS 210 performs OPC with respect to a multiple column index table, DBMS 210 can preserve the order information of the initial column C0. However, in the absence of features set forth herein order information of subsequent columns (C1-Cn) of index table 1201 can be expected to be lost by the performance of the OPC.

In accordance with features herein, DBMS 210 on completion of OPC at block 1102 can proceed to determination of one or more modification factor at block 1103. As set forth in more detail herein, such one or more modification factor can be used in the recovery of order information of a subsequent column (C1-Cn) of an index table 1201 having multiple columns. Example B is a representation of index table 1201.

Example B (Index Table 1201)

| Row | Row ID | C0 | C1 | C2 | C3 |
|---|---|---|---|---|---|
| 0 | XX | 114 | 12 | 20 | 900 |
| 1 | XX | 125 | 14 | 25 | 876 |
| 2 | XX | 130 | 15 | A5 | 540 |
| ... | ... | ... | ... | ... | ... |

---

Figure 3:
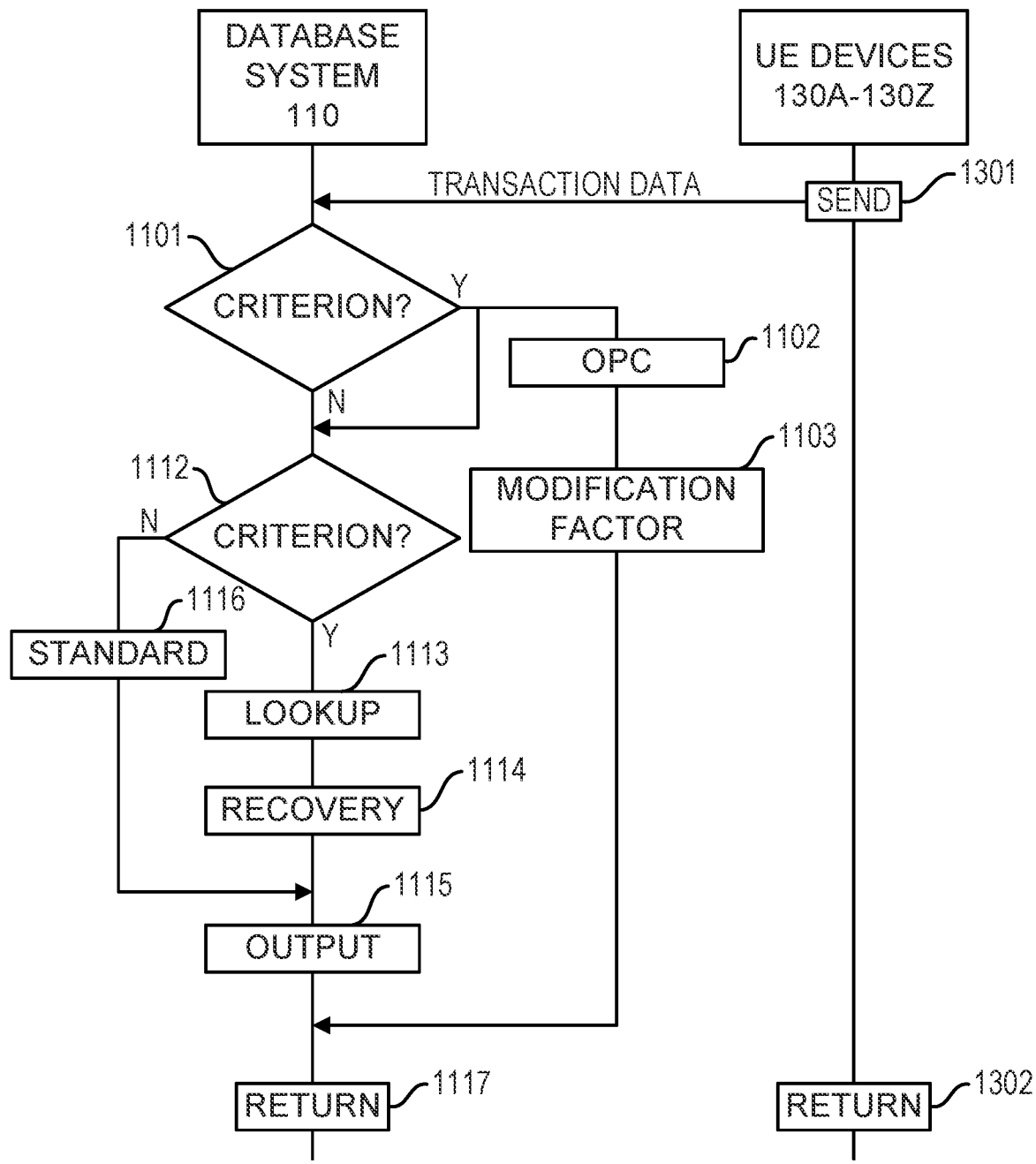
FIG. 3 is a flowchart illustrating a method for performance by a database system interoperating with UE devices according to one embodiment.
Figure 4:
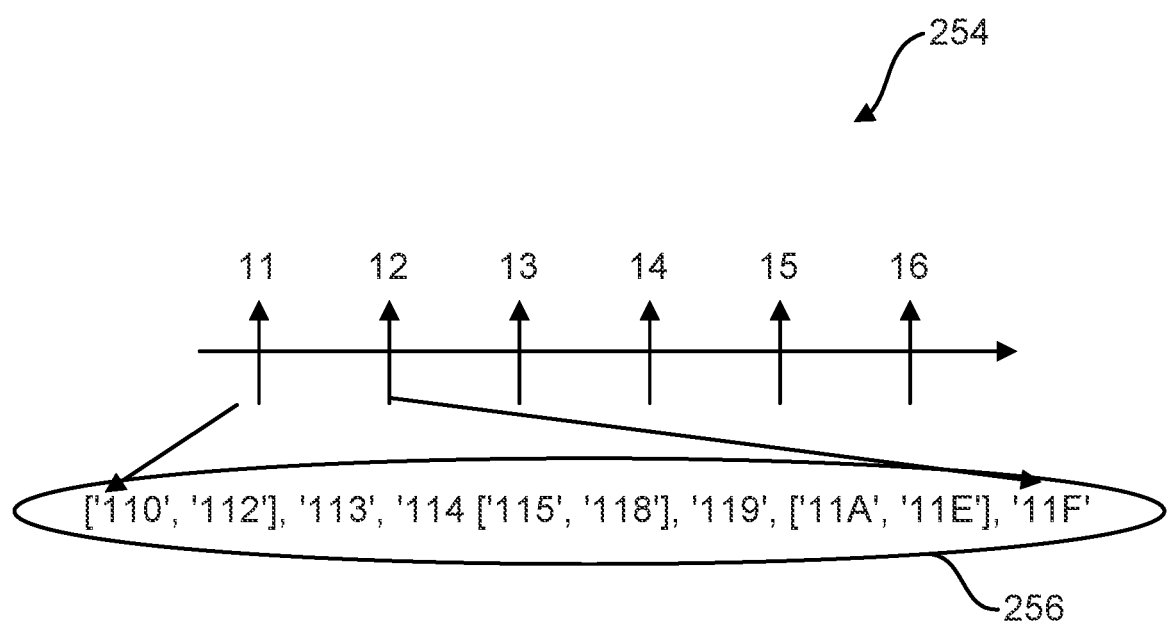
FIG. 4 depicts a compression axis for use in performance of order preserving compression (OPC) according to one embodiment.
Figure 5:
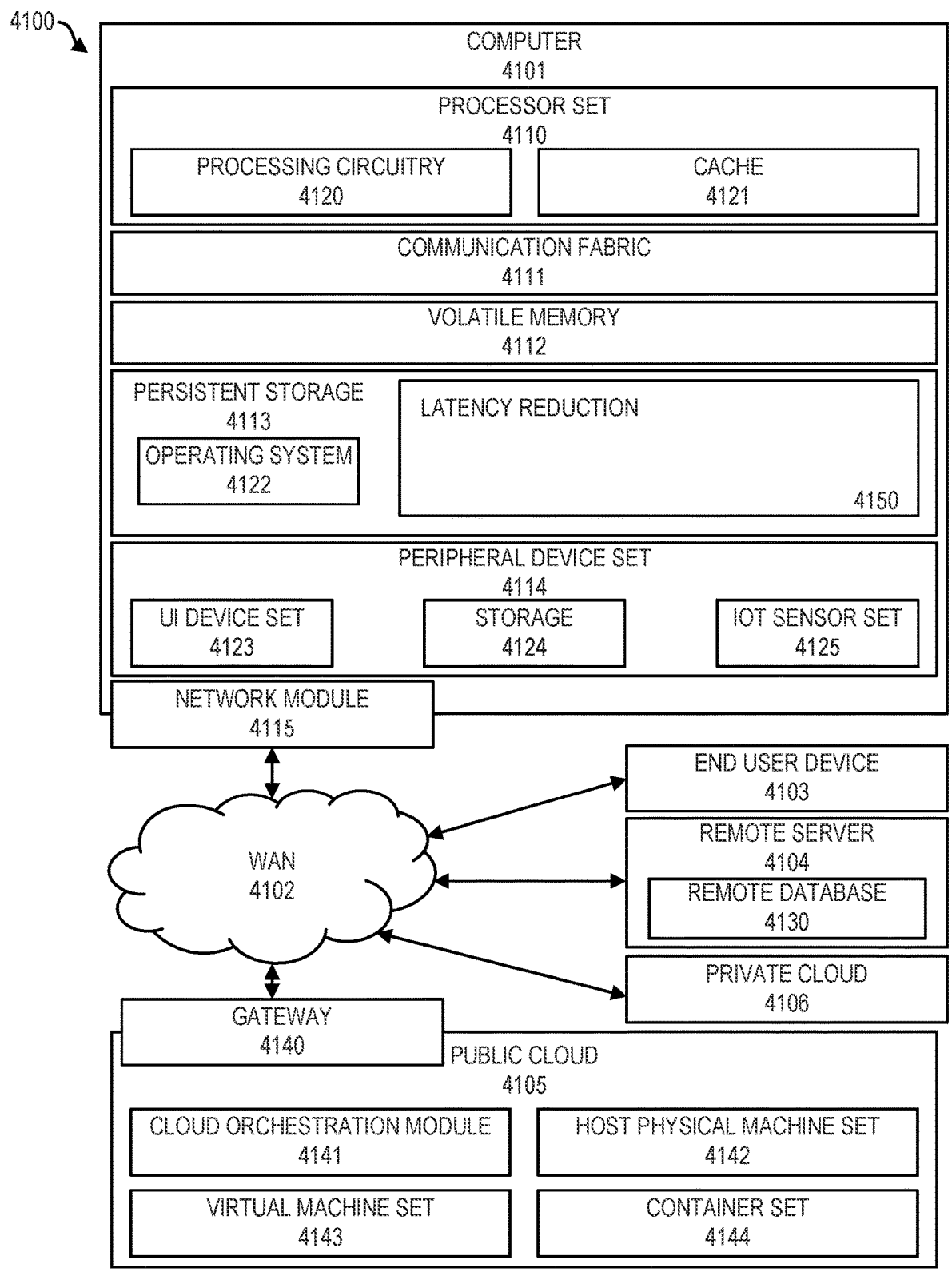
FIG. 5 depicts a computing environment according to one embodiment.

With reference to string axis 254 as shown in Fig. 3, the circled portion 256 indicates the patterns that will be occurring within the range of 11 and 12.
Dictionary creation:
DBMS 210 can create dictionary 252 by taking into account the most frequently occurring patterns in database 108 recognizing impracticalities of taking into account all the patterns that occur to be part of dictionary 252. For the referred to string axis 254, the pattern with most frequencies will be given a separate encoding. For the least frequency pattern, DBMS 210, in accordance with the described OPC method can form the range and give the ranges encodings.
In the example of Fig. 3, 113, 114 are the most frequent patterns and the values like
115, 116, 117, 118 are less frequent hence they are put in a range as [115, 118] between the most frequent patterns 114 & 119.
Example of a dictionary:
DBMS 210 can use dictionary 252 to provide a fixed-length encoding output for a particular pattern. An example with reference to string axis 254 of Fig. 3 is as follows.
['110', '112'] - ('0000', 8)
'113' - ('0001', 12):
'114' - ('0010', 12):
['115', '118'] - ('0011', 8):
'119' - ('0101', 12):
['11A', '11E'] - ('0110', 8):
'11F' - ('0111', 12):
In dictionary 252, DBMS 210 can store first and second values as follows. 1: Encoder output, and 2: The count of bits for which the encoding is applicable (this value is useful for the less frequent patterns).
In the example described with reference to the string axis of Fig. 3, 113 has encodings 0001 and the encoding persists for the entire pattern 113. When DBMS 210 uses the less frequent range patterns [115, 118] the encodings are applicable for the common patterns in the range (in the described example the common pattern is '11').
How Encoder works?
If the input to the encoder is 114115AF
For this example, DBMS 210 can search for the longest pattern (which can be previously defined)/
In one example, DBMS 210 can define longest pattern for an input can be defined as 12-bits for which encoder can give output. In the described example, we dictionary 252 has the output for 114(max size we have defined) = 0010 and then 115 is part of the reference range. Accordingly, the output of encoder is applicable to the common part 11 = 0011 and then while searching for the next pattern, DBMS 210 can search in the dictionary for '5AF' which will be the part of some other portion of the string axis 254 referenced in Fig. 3.
Output:
114115AF = 00100011XXX
Algorithm:
if (114) is in dictionary 252:
code(114)
Increment input by 12-bits
Else:
code(interval in which '114' is present)
Increment input by common byte of the min and max interval values In reference to the index table 1201 depicted as Example B, the depicted index table 1201 is a multiple column index table having initial column C0 and one or more subsequent column C1-Cn where n=3. In the described example, the one or more subsequent column is provided by the subsequent columns C1, C2, and C3. However, in another embodiment the one or more subsequent column can include a single subsequent column, i.e., just column C1, or in another embodiment, can include n subsequent columns, where n is an arbitrary integer. In the performance of OPC at block 1102, DBMS 210 can refrain from compressing the depicted row ID (RID). In such manner, pointer information of a given index table (not represented in Example B) can remain referenced to a raw (uncompressed) row ID even after compression of the index table 1201 as represented by Example B.

In determining one or more modification factor at block 1103, DBMS 210 can apply modification factor determination rules as are summarized in Example C.

Example C (Modification Factor Determination Rules)

---

C.1 For each row, $R_j$ Let the encoding of the entire row be $E_j$

C.2 For a given column $C_{j,i}$ in row $R_j$, Zero out all bits in column $C_{j,0} - C_{ji-1}$ to obtain $C_{j,i\text{-}post}$ C.3 Encode $C_{j,i\text{-}post}$ as per the OPC dictionary rules to obtain $E_{j,i\text{-}post}$ C.4 Compute modification factor $M_{j,i} = E_{j,i\,post}/Ej$ C.5 Store all compressed rows $E_j$ and all modification factors $M_{j,I}$

---

Where the encoding referenced in Example C is the OPC encoding set forth in reference to Example A.

In determining one or more modification factor, DBMS 210, according to one embodiment, can determine modification factors on a row by row basis. In determining one or more modification factor, DBMS 210 can determine a modification factor for each subsequent column (C1-Cn) of each row j of an index table 1201. Thus, in the described example of Example B. DBMS 210 can determine for each row j of index table 1201 a modification factor for each column from column C1 onward. In the performance of OPC (Example A), order information of column C0 can be preserved through the compression. Accordingly, DBMS 210 can refrain from determining modification factors for rows of column C0.

In reference to Example C. DBMS 210 can determine the following modification factors for representative cells of index table 1201.

Modification factor for $C(0,1)=M(0.1)$=Encoding (0001220900)/Encoding(1141220900)

Modification factor for $C(1,2)=M(1,2)$=Encoding (0000025876)/Encoding(1251425876)

DBMS 210, according to one embodiment, can compute a modification factor by dividing the encoded value of a modified row by an encoded value of the entire row. The modified row can be provided so that a particular column of interest is highlighted by replacing other columns with constant values (zero or one). Such a modified row allows easier identification and comparison on the given column of interest. By multiplying the encoded row by the modification factor, DBMS 210 can recover the encoded value of the modified row with the column of interest highlighted for query execution, i.e., comparison.

On the determination of the described modification factors, DBMS 210 can store the modification factors to database 108 appropriately referenced to their associated index table 1201. On completion of block 1103, DBMS 210 can proceed to return block 1117.

With further reference to the flowchart of FIG. 2, DBMS 210 at criterion block 1112 can ascertain whether a current incoming query received in response to send block 1301 references a subsequent column, e.g., column C1, C2, or C3 as referenced in Example B of a multiple column index table that is in a compressed state. As illustrated in the flowchart FIG. 3, DBMS 210 can proceed to criterion block 1112 on performance of criterion block 1101 irrespective of whether a result of criterion block 1101 is YES or NO.

On the determination at block 1112 that the incoming query references an initial column or an underlying table having a table index in an uncompressed state. DBMS 210 can proceed to block 1116 where DBMS 210 can process the query according to standard operation. According to the standard operation processing path of block 1116, DBMS 210 uses preserved order information of an initial column C0 of a compressed index table, or order information of a raw (uncompressed) index table 1201 for index-aided accelerated access to underlying table data (output block 1115) stored on a pointed to leaf page 2130 pointed to by pointer information of index table 1201.

On the determination at block 1112 that the incoming query sent at block 1301 references a subsequent column of a compressed index table in a compressed state compressed using OPC, DMBS 210 can proceed to lookup block 1113. At lookup block 1113, DBMS 210 can look up and retrieve from database 108 one or more modification factor previously stored in database 108 at block 1103, and at block 1113, DBMS 210 can perform column order recovery using the one or more modification factor. DBMS 210 performing column order recovery using the one or more modification factor according to one embodiment is described in Example D.

Example D (Column Order Recovery)

---

D.1 Let the given query be on column c, where column c is a subsequent column

D.2 Create an element $Q_{c\text{-}min}$ by prepending columns 0 to c-1 with zeros and appending columns c + 1 till end with zeros D.3 Create an element $Q_{c\text{-}max}$ by prepending columns 0 to c-1 with zeros and appending columns c + 1 till end with ones D.4 Encode both the elements to obtain $EQ_{c\text{-}min}$ and $EQ_{c\text{-}max}$ D.5 To perform the comparison for a given row j of the original table, check that $EQ_{c\text{-}min}$ <= $(E_j \times M_{j,c})$ <= $EQ_{c\text{-}max}$

---

During query execution on any subsequent column that is subsequent to an initial column (involving column C1-Cn), DBMS 210 can perform a comparison for a plurality of rows of the compressed/encoded table (index table 1201 in compressed state) against the query to find a match. Once DBMS 210 identifies a match as a result of the performing the described comparison, DBMS 210 for performing column order recovery can flag the matching row as the pointed to row pointed to by the index table 1201 and can use the row ID (RID) of the flagged matching row of the compressed table to extract the row from the underlying table 111 of database 108 as stored on leaf page 2130 and return the query result at output block 1115.

For performing comparison between an encoded row and a query, DBMS 210 can transform the encoded row using a determined modification factor as determined according to Example D for the appropriate column and row as set forth in D.5 and can further transform the query. For transforming the query, DBMS 210 can apply the query prepending and query appending rules as set forth in D.2, D.3 and encoding rules of D.4 for derivation of minimum and maximum transformed query values as set forth in D.4. According to D.5, DBMS 210 can, for transforming respective rows of index table 1201 (in compressed state) multiply the encoded row by the previously stored modification factor of that row computed for the column that the query is looking up. According to D.2, D.3, D.4, DBMS 210 can transform the query itself by encoding the query with the column of interest highlighted by replacing other columns with constants (zeros or ones). DBMS 210 at D.5 can check the transformed query against the transformed encoded row for index table column order recovery and identification of a matching row which can be flagged as the pointed to row referenced by index table 1201.

Performance of column order recovery according to Example D is set forth further in reference to the following example. In one scenario, an incoming query received by database system 110 can be received in response to send block 1301 that references the column C2 value "25" as specified in the index table 1201 example described in reference to Example B (showing index table 1201).

In response to the received query, DBMS 210 can apply D.2 and D.3 to create a range [0000025000, 0000025FFF] then at D.4 through the same OPC process for compressing index table 1201 can produce a compressed encoding for the range values 0000025000 and 0000025FFF. Accordingly, DBMS 210 can produce the following values.

$Qc\text{-min}=0000025000$ (by D.2)

$Qc\text{-max}=0000025FFF$ (by D.3)

$E_{j,i\text{-post-min}}=\text{Encoding}(Qc\text{-min})$ (by D.4)

$E_{j,i\text{-post-max}}=\text{Encoding}(Qc\text{-max})$ (by D.4)

DBMS 210 for comparing respective rows j of index table 1201 to the incoming query can multiply the modification factor with the encodings of the row where the column is present (M(j,2)*Encoding(1251425876)). DMBS 210 can perform the comparison between the incoming query and the encoded row of index table according to D.5 as follows.

$E_{j,i\text{-post-min}}<=(M_{j,i})\times E_j<=E_{j,i\text{-post-max}}$ (by D.5)

For index table rows other than j=1, (M(j,2)*Encoding (1251425876) can be outside of the transformed min and max query boundaries, and DMBS 210 accordingly can disqualify the row as the pointed to row. For the index table row j=1, (M(j,2)*Encoding (1251425876) can be inside of the transformed min and max query boundaries, and DMBS 210 accordingly for index table column order recovery flag the row j–=1 as the matching pointed to row of the index table. DBMS 210 can use the row ID (RID) of the flagged matching row of the compressed table to extract the row from the underlying table 111 of database 108 as stored on leaf page 2130 and return the query result at output block 1115.

DBMS 210 can apply the rules of Example B to recover pointer information of a compressed index table column that has been compressed by OPC. According to the index table column order recovery rules of Example D, embodiments herein will recognize that the value $(E_j \times M_{j,c})$ will be between $EQ_{c\text{-min}}$ and $EQ_{c\text{-max}}$ for one tested row which can be selected as the matching pointed to row of index table 1201. DBMS 210 for a plurality of tested rows (e.g. starting from row 0) can determine that $(E_j \times M_{j,c})$ is not between $EQ_{c\text{-min}}$ and $EQ_{c\text{-max}}$ and based on such determination can disqualify the row as the matching pointed to row. Further according to the column order recover rules of Example D. DBMS 210 can determine for one isolated row j that $EQ_{c\text{-min}}<=(E_j \times M_{j,c})<=EQ_{c\text{-max}}$ and can select such row as the matching pointed to row of index table 1201.

DBMS 210 performing OPC (block 1102), modification factor determination (block 1103), modification factor lookup (block 1113), and index table column order recovery (block 1114), according to one embodiment, is further described with reference to the following example.

According to one example, index table 1201 can include column C0, C1, and C2 at row j=match given (in hexadecimal) by: 2ca1|89|43ed.

At OPC block 1102, DBMS 210 can subject the row j=match to OPC (along with the remaining rows of the index table) for return of the compressed encoded row: Encoded (2ca1|89|43ed) (by C.1).

At modification factor block 1103, DBMS 210 can determine the modification factor $M_{j=match,c=C1}$ as follows: Encoded (0000|89|43ed) divided by Encoded (2ca1|89|43ed)=(0000| 89| 43ed)/(2ca1|89|43ed) (by C.2, C.3, and C.4).

At block 1112, DBMS 210 can determine that the received query received in response to send block 1301 references the second column C1 with the value 89. DBMS 210 at block 1113 can responsively look up one or more modification factor for column C1.

DBMS 210 at block 1114 can compare multiple rows j of index table 112 (including the row j=match) to the incoming query by application of the column order recovery rules of Example D. In performing the comparison, DBMS 210 can apply index table row transformation using the looked up modification factor according to D.5 for the relevant row and column and can apply query transformation according to D.2, D.3, and D.4.

DBMS 210 can produce $EQ_{c\text{-min}}$ (via D.2 and D.4) as follows: Encoded (0000| 89|0000). Further, DBMS 210 can produce $EQ_{c\text{-max}}$ (via D.2 and D.4) as follows: Encoded (0000| 89| ffff).

For the row j=match, DBMS 210 can perform comparison according to D.5 as follows: Encoded (0000| 89| 0000)<=Encoded (2ca1| 89| 43ed) multiplied by Encoded (0000| 89| 43ed)/Encoded (2ca1| 89| 43ed)<=Encoded (0000| 89|ffff).

For the row j=match, the transformed encoded index table row transformed according to $(E_j \times M_{j,c})$ will be between the min and max boundaries, and DMBS 210 for column order recovery can flag the row j=match as the matching pointed to row. DBMS 210 can use the RID for the matching row to access leaf page stored row data from database 108 at output block 1115. For remaining rows j, ($E_j \times M_{j,c}$) will be outside of the described min and max boundaries, and DBMS 210 can disqualify the row as a pointed to row. If the comparison is outside the bounds, then that particular row is not a match for the query. If the equation is true, i.e., within bounds, then that row is a match for the query and the RID is used to return the row from the database as a result of the query.

Accordingly, there is set forth herein, in reference to FIGS. 1-5, performing order preserving compression of a multiple column index table of a database to provide an encoded index table sorted by an initial column, e.g., as set forth in reference to OPC block 1102, wherein the multiple column index table includes the initial column and one or more subsequent column, e.g., as depicted in Example B; determining, in dependence on a result of the performing the order preserving compression, at least one modification factor for respective ones of the one or more subsequent column, e.g., as set forth in reference to block 1103; storing the at least one modification factor to the database, e.g., as set forth in reference to block 1103; receiving a query, e.g., as set forth in reference to block 1301 and block 1112; examining the query and determining, based on the examining, that the query references a subsequent column of the one or more subsequent column, e.g., as set forth in reference to block 1112; responsively to the determining that the query references the subsequent column, retrieving from the database a modification factor for the subsequent column, e.g., as set forth in reference to lookup block 1113; and processing the query with use of the modification factor for the subsequent column, e.g., as set forth in reference to block 1114.

In reference to C.4 (multiplication factor determination), it can be seen that, for a given column, c=Ci, all preceding bits prior to c=Ci can be zero for all rows. Accordingly, for a given column, c=Ci, all the modification factors for all rows can share a common modification factor. Accordingly, it can be seen that several of the most significant bits (MSBs) of all the modification factors would have the same common value for a given column. This is because all preceding bits are zero for all rows. The common value can be stored in database 108 once per table rather than for each row. The remaining bits of each modification factor are dependent on the particular row. Accordingly, storage of modification factors can be optimized by providing a common factor for all rows.

According to another optimization, $M_{j,i}$ can be truncated to a lower precision. According to an optimization, the comparison condition of D.5 can be expressed as D.5.1: $E_{j,i\text{-}post\text{-}min} <= \text{round } (M_{j,i}) \times E <= E_{j,i\text{-}post\text{-}max}$. The described optimization can truncate a modification factor by removing some of the least significant bits (LSBs) such that the equation still holds for the largest possible $E_{j,i\text{-}post\text{-}min}$ and the smallest possible $E_{j,i\text{-}post\text{-}max}$. Accordingly, storage of modification factors can be optimized by truncating a precision of the modification factor to as many bits as is needed to achieve query execution.

On completion of output block 1115, DBMS 210 can proceed to return block 1117. At return block 1117, database system 110 can return to a stage preceding block 1101 to receive a next query at block 1101. DBMS 210 can be iteratively performing the loop depicted by blocks 1101-1117 for a deployment period of database system 110. DBMS 210 can be performing multiple instances of the loop of blocks 1101-1117 simultaneously and concurrently. On completion of send block 1301, UE devices 130A-130Z can proceed to return block 1302. At return block 1302, UE devices 130A-130Z can return to a stage preceding block 1301. UE devices 130A-130Z can be iteratively performing the loop of blocks 1301 and 1302 for a deployment period of system 100.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computer implemented method also includes performing order preserving compression of a multiple column index table of a database to provide an encoded index table sorted by an initial column, where the multiple column index table includes the initial column and one or more subsequent column. The method also includes determining, in dependence on a result of the performing the order preserving compression, at least one modification factor for respective ones of the one or more subsequent column. The method also includes storing the at least one modification factor to the database. The method also includes receiving a query. The method also includes examining the query and determining, based on the examining, that the query references a subsequent column of the one or more subsequent column. The method also includes responsively to the determining that the query references the subsequent column, retrieving from the database a modification factor for the subsequent column. The method also includes processing the query with use of the modification factor for the subsequent column. Other embodiments of this aspect include corresponding computer systems, apparatus, and computer programs recorded on one or more computer storage devices, each configured to perform the actions of the methods.

Implementations may include one or more of the following features. The computer implemented method where the determining, in dependence on a result of the performing the order preserving compression, at least one modification factor for respective ones of the one or more subsequent column includes transforming a row of the multiple column index table, where the transforming includes zeroing out bits of the row. The processing the query with use of the modification factor for the subsequent column includes zeroing out bits of the query. The processing the query with use of the modification factor for the subsequent column includes transforming bits of the query into ones. The processing the query with use of the modification factor for the subsequent column includes multiplying a row of the encoded index table by the modification factor for the subsequent column. The processing the query with use of the modification factor for the subsequent column includes comparing a row of the encoded index table to the query. The processing the query with use of the modification factor for the subsequent column includes comparing a row of the encoded index table to the query, where the comparing includes transforming the row of the encoded index table using the modification factor for the subsequent column, and further transforming the query. The processing the query with use of the modification factor for the subsequent column includes comparing a row of the encoded index table to the query, where the comparing includes transforming the row of the encoded index table using the modification factor for the subsequent column to output a transformed row, and further transforming the query to output expressions for minimum and maximum bounds for the query, and where the comparing includes flagging the row as a matched pointed to row when the transformed row is within the minimum and maximum bounds. The processing the query with use of the modification factor for the subsequent column includes comparing a row of the encoded index table to the query, where the comparing includes transforming the row of the encoded index table using the modification factor for the subsequent column to output a transformed row, and further transforming the query to output expressions for minimum and maximum bounds for the query, and where the comparing includes flagging the row as a matched pointed to row when the transformed row is within the minimum and maximum bounds, and where the method further includes accessing underlying leaf page stored table data of the database using a row ID of the row responsively to the flagging. The storage of the modification factors is optimized by having a common factor for all rows. The storage of the modification factors is optimized by truncating the precision of the modification factor to as many bits as needed to achieve query execution. Implementations of the described techniques may include hardware, a method or process, or computer software on a computer-accessible medium.

The system also includes a memory; at least one processor in communication with the memory; and program instructions executable by one or more processor via the memory to perform a method may include: performing order preserving compression of a multiple column index table of a database to provide an encoded index table sorted by an initial column, where the multiple column index table includes the initial column and one or more subsequent column; determining, in dependence on a result of the performing the order preserving compression, at least one modification factor for respective ones of the one or more subsequent column; storing the at least one modification factor to the database; receiving a query; examining the query and determining, based on the examining, that the query references a subsequent column of the one or more subsequent column; responsively to the determining that the query references the subsequent column, retrieving from the database a modification factor for the subsequent column; and processing the query with use of the modification factor for the subsequent column. Other embodiments of this aspect include corresponding computer systems, apparatus, and computer programs recorded on one or more computer storage devices, each configured to perform the actions of the methods.

Implementations may include one or more of the following features. The system where the determining, in dependence on a result of the performing the order preserving compression, at least one modification factor for respective ones of the one or more subsequent column includes transforming a row of the multiple column index table, where the transforming includes zeroing out bits of the row. The processing the query with use of the modification factor for the subsequent column includes zeroing out bits of the query. The processing the query with use of the modification factor for the subsequent column includes transforming bits of the query into ones. The processing the query with use of the modification factor for the subsequent column includes multiplying a row of the encoded index table by the modification factor for the subsequent column. The processing the query with use of the modification factor for the subsequent column includes comparing a row of the encoded index table to the query. Implementations of the described techniques may include hardware, a method or process, or computer software on a computer-accessible medium.

One general aspect includes a computer readable storage medium readable by one or more processing circuit and storing instructions for execution by one or more processor for performing a method may include: performing order preserving compression of a multiple column index table of a database to provide an encoded index table sorted by an initial column, where the multiple column index table includes the initial column and one or more subsequent column; determining, in dependence on a result of the performing the order preserving compression, at least one modification factor for respective ones of the one or more subsequent column; storing the at least one modification factor to the database; receiving a query; examining the query and determining, based on the examining, that the query references a subsequent column of the one or more subsequent column; responsively to the determining that the query references the subsequent column, retrieving from the database a modification factor for the subsequent column; and processing the query with use of the modification factor for the subsequent column. Other embodiments of this aspect include corresponding computer systems, apparatus, and computer programs recorded on one or more computer storage devices, each configured to perform the actions of the methods.

Certain embodiments herein may offer various technical computing advantages involving computing advantages to address problems arising in the realm of computer systems. Embodiments herein can include performing of order preserving compression (OPC) on a database multiple column index table in a manner that order information of one or more subsequent column of the index table is recoverable and therefore preserved through the performance of OPC. Embodiments herein can include determining one or more modification factor in dependence on a result of performing OPC on a multiple column index table. On receipt of an incoming query referencing a subsequent column of the one or more subject column, a database system can look up a stored multiplication factor of the one or more multiplication factor and employ the multiplication factor for recovery of order information of the subsequent column. For query handling according to one embodiment, a database system can compare respective ones of a plurality rows of a compressed encoded index table to the incoming query. To facilitate the described comparing, the database system can transform a compressed encoded row of the index table using the looked up multiplication factor and can further transform the query. When a compared row matches the incoming query, the database system can flag the matched row as the pointed to row of the compressed encoded index table, and can employ a row ID of the matched for access to underlying leaf node stored table data of a database. By performance of order preserving compression of a multiple column index table in a manner that order information of multiple columns is preserved, the index table remains functional to provide accelerated index-assisted access to underlying table data referenced to the multiple tables. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

In reference to FIG. 6 there is set forth a description of a computing environment 4100 that can include one or more computer 4101. In one example, computing node 10 as set forth herein can be provided in accordance with computer 4101 as set forth in FIG. 6.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 6. In one aspect, a computing environment 4100 contains an example of an environment for the execution of at least some of the computer code involved in performing the inventive methods, such as code 4150 for performing multiple column order preserving compressing described with reference to FIGS. 1-5. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    performing order preserving compression of a multiple column index table of a database to provide an encoded index table sorted by an initial column, wherein the multiple column index table includes the initial column and one or more subsequent column;
    determining, in dependence on a result of the performing the order preserving compression, at least one modification factor for respective ones of the one or more subsequent column;
    storing the at least one modification factor to the database;
    receiving a query;
    examining the query and determining, based on the examining, that the query references a subsequent column of the one or more subsequent column;
    responsively to the determining that the query references the subsequent column, retrieving from the database a modification factor for the subsequent column; and
    processing the query with use of the modification factor for the subsequent column.

2. The computer implemented method of claim 1, wherein the determining, in dependence on a result of the performing the order preserving compression, at least one modification factor for respective ones of the one or more subsequent column includes transforming a row of the multiple column index table, wherein the transforming includes zeroing out bits of the row.

3. The computer implemented method of claim 1, wherein the processing the query with use of the modification factor for the subsequent column includes zeroing out bits of the query.

4. The computer implemented method of claim 1, wherein the processing the query with use of the modification factor for the subsequent column includes transforming bits of the query into ones.

5. The computer implemented method of claim 1, wherein the processing the query with use of the modification factor for the subsequent column includes multiplying a row of the encoded index table by the modification factor for the subsequent column.

6. The computer implemented method of claim 1, wherein the processing the query with use of the modification factor for the subsequent column includes comparing a row of the encoded index table to the query.

7. The computer implemented method of claim 1, wherein the processing the query with use of the modification factor for the subsequent column includes comparing a row of the encoded index table to the query, wherein the comparing includes transforming the row of the encoded index table using the modification factor for the subsequent column, and further transforming the query.

8. The computer implemented method of claim 1, wherein the processing the query with use of the modification factor for the subsequent column includes comparing a row of the encoded index table to the query, wherein the comparing includes transforming the row of the encoded index table using the modification factor for the subsequent column to output a transformed row, and further transforming the query to output expressions for minimum and maximum bounds for the query, and wherein the comparing includes flagging the row as a matched pointed to row when the transformed row is within the minimum and maximum bounds.

9. The computer implemented method of claim 1, wherein the processing the query with use of the modification factor for the subsequent column includes comparing a row of the encoded index table to the query, wherein the comparing includes transforming the row of the encoded index table using the modification factor for the subsequent column to output a transformed row, and further transforming the query to output expressions for minimum and maximum bounds for the query, and wherein the comparing includes flagging the row as a matched pointed to row when the transformed row is within the minimum and maximum bounds, and wherein the method further includes accessing underlying leaf page stored table data of the database using a row ID of the row responsively to the flagging.

10. The computer implemented method of claim 1, wherein subsequent column of the one or more subsequent column is a second column of the multiple column index table.

11. The computer implemented method of claim 1, wherein subsequent column of the one or more subsequent column is an nth column of the multiple column index table.

12. The computer implemented method of claim 1, wherein storage of modification factors including the at least one modification factor is optimized by providing a common factor for all rows.

13. The computer implemented method of claim 1, wherein storage of modification factors including the at least one modification factor is optimized by truncating a precision of the modification factor to as many bits as is needed to achieve query execution.

14. A system comprising:
a memory;
at least one processor in communication with the memory; and
program instructions executable by one or more processor via the memory to perform a method comprising:
performing order preserving compression of a multiple column index table of a database to provide an encoded index table sorted by an initial column, wherein the multiple column index table includes the initial column and one or more subsequent column;
determining, in dependence on a result of the performing the order preserving compression, at least one modification factor for respective ones of the one or more subsequent column;
storing the at least one modification factor to the database;
receiving a query;
examining the query and determining, based on the examining, that the query references a subsequent column of the one or more subsequent column;
responsively to the determining that the query references the subsequent column, retrieving from the database a modification factor for the subsequent column; and
processing the query with use of the modification factor for the subsequent column.

15. The system of claim 14, wherein the determining, in dependence on a result of the performing the order preserving compression, at least one modification factor for respective ones of the one or more subsequent column includes transforming a row of the multiple column index table, wherein the transforming includes zeroing out bits of the row.

16. The system of claim 14, wherein the processing the query with use of the modification factor for the subsequent column includes zeroing out bits of the query.

17. The system of claim 14, wherein the processing the query with use of the modification factor for the subsequent column includes transforming bits of the query into ones.

18. The system of claim 14, wherein the processing the query with use of the modification factor for the subsequent column includes multiplying a row of the encoded index table by the modification factor for the subsequent column.

19. The system of claim 14, wherein the processing the query with use of the modification factor for the subsequent column includes comparing a row of the encoded index table to the query.

20. A computer program product comprising:
a computer readable storage medium readable by one or more processing circuit and storing instructions for execution by one or more processor for performing a method comprising:
performing order preserving compression of a multiple column index table of a database to provide an encoded index table sorted by an initial column, wherein the multiple column index table includes the initial column and one or more subsequent column;
determining, in dependence on a result of the performing the order preserving compression, at least one modification factor for respective ones of the one or more subsequent column;
storing the at least one modification factor to the database;
receiving a query;
examining the query and determining, based on the examining, that the query references a subsequent column of the one or more subsequent column;
responsively to the determining that the query references the subsequent column, retrieving from the database a modification factor for the subsequent column; and
processing the query with use of the modification factor for the subsequent column.

* * * * *